(12) United States Patent
Kume et al.

(10) Patent No.: US 10,823,162 B2
(45) Date of Patent: *Nov. 3, 2020

(54) VARIABLE-CAPACITY COMPRESSOR CONTROL VALVE

(71) Applicant: Fujikoki Corporation, Tokyo (JP)

(72) Inventors: Yoshiyuki Kume, Tokyo (JP); Hisashi Asano, Tokyo (JP); Takashi Sakamoto, Tokyo (JP); Masaharu Itoh, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 111 days.

This patent is subject to a terminal disclaimer.

(21) Appl. No.: 16/306,445

(22) PCT Filed: Apr. 20, 2017

(86) PCT No.: PCT/JP2017/015862
§ 371 (c)(1),
(2) Date: Nov. 30, 2018

(87) PCT Pub. No.: WO2018/003254
PCT Pub. Date: Jan. 4, 2018

(65) Prior Publication Data
US 2019/0293061 A1    Sep. 26, 2019

(30) Foreign Application Priority Data
Jun. 28, 2016 (JP) .................. 2016-127978

(51) Int. Cl.
*F04B 27/18* (2006.01)
*F16K 11/044* (2006.01)
*F16K 11/048* (2006.01)

(52) U.S. Cl.
CPC ........ *F04B 27/1804* (2013.01); *F16K 11/044* (2013.01); *F16K 11/048* (2013.01);
(Continued)

(58) Field of Classification Search
CPC .................. F04B 27/1804; F04B 39/14; F04B 2027/1859; F04B 2027/1881;
(Continued)

(56) References Cited

U.S. PATENT DOCUMENTS

2001/0003573 A1  6/2001  Kimura et al.
2005/0218364 A1  10/2005  Ohi et al.
(Continued)

FOREIGN PATENT DOCUMENTS

JP      07-32270 U     6/1995
JP      2001-165055 A  6/2001
(Continued)

OTHER PUBLICATIONS

Korean Intellectual Property Office, "Notification of Reason for Refusal" dated Jan. 16, 2020 and issued in the corresponding Korean patent application No. 10-2018-7035772, and its machine generated English Translation (7 pages).

*Primary Examiner* — Eric Keasel
(74) *Attorney, Agent, or Firm* — Lucas & Mercanti, LLP

(57) ABSTRACT

Provided is a variable-capacity compressor control valve with a simple configuration that can increase the attraction force of an electromagnetic actuator and thus can reduce the size of the control valve. A sub valve element that is a magnetic body made of the same magnetic material as or a different magnetic material from that of a plunger, which is adapted to move a main valve element in the direction to open or close the valve orifice, is fitted in and fixed to the plunger.

4 Claims, 8 Drawing Sheets

(52) U.S. Cl.
CPC ............... *F04B 2027/1822* (2013.01); *F04B 2027/1827* (2013.01)

(58) Field of Classification Search
CPC ...... F04B 2027/1827; F04B 2027/8131; F04B 2027/1854; F04B 2027/1877
See application file for complete search history.

(56) References Cited

U.S. PATENT DOCUMENTS

| | | | | |
|---|---|---|---|---|
| 2006/0086918 A1* | 4/2006 | Koyama | ............. | F04B 27/1804 251/129.01 |
| 2006/0228227 A1* | 10/2006 | Mori | .................. | F04B 27/1804 417/222.2 |
| 2012/0056113 A1 | 3/2012 | Tano et al. | | |

FOREIGN PATENT DOCUMENTS

| | | |
|---|---|---|
| JP | 2006-242321 A | 9/2006 |
| JP | 2010-185285 A | 8/2010 |
| JP | 2012-211579 A | 11/2012 |
| JP | 2012-246914 A | 12/2012 |
| JP | 2013-130126 A | 7/2013 |

\* cited by examiner

At Transition to Compressor Actuation
(Main Valve Element (Pd-Pc): Closed,
Sub Valve Element (Pc-Ps): Closed)

U-U Cross-Section

[Normal Control Time]

[Compressor Actuation Time]

VARIABLE-CAPACITY COMPRESSOR CONTROL VALVE

CROSS-REFERENCE TO RELATED APPLICATIONS

This application is a 371 of PCT/JP2017/015862, filed Apr. 20, 2017, which claims benefit of Japanese Patent Application No. 2016-127978 filed on Jun. 28, 2016.

TECHNICAL FIELD

The present invention relates to a variable-capacity compressor control valve for use in an automotive air conditioner or the like.

BACKGROUND ART

Conventionally, a variable-capacity swash plate compressor such as the one schematically shown in FIG. 6 has been used as a compressor for an automotive air conditioner. The variable-capacity swash plate compressor 100 includes a rotating shaft 101 that is rotationally driven by an on-vehicle engine, a swash plate 102 that is attached to the rotating shaft 101, a crank chamber 104 in which the swash plate 102 is disposed, a piston 105 that is reciprocated by the swash plate 102, a discharge chamber 106 for discharging refrigerant compressed by the piston 105, a suction chamber 107 for sucking refrigerant, an in-compressor release passage (i.e., a fixed orifice) 108 for releasing the pressure Pc in the crank chamber 104 to the suction chamber 107, and the like.

Meanwhile, a control valve 1' used for the aforementioned variable-capacity compressor receives the discharge pressure Pd from the discharge chamber 106 of the compressor 100 and is configured to control the pressure Pc in the crank chamber 104 by controlling the discharge pressure Pd in accordance with the suction pressure Ps of the compressor 100. Such a control valve 1' has, as the basic configuration, a valve body that includes a valve chamber with a valve orifice, a Ps introduction port communicating with the suction chamber 107 of the compressor 100, a Pd introduction port arranged upstream of the valve orifice and communicating with the discharge chamber 106 of the compressor 100, and a Pc outlet port arranged downstream of the valve orifice and communicating with the crank chamber 104 of the compressor 100; a valve element (i.e., a valve stem) for opening or closing the valve orifice; an electromagnetic actuator with a plunger for moving the valve element in the direction to open or close the valve orifice (i.e., in the vertical direction); a pressure-sensitive chamber that receives the suction pressure Ps from the compressor 100 via the Ps introduction port; and a pressure-sensitive reaction member that urges the valve element in the direction to open or close the valve orifice in accordance with the pressure in the pressure-sensitive chamber. The valve element and the valve orifice form a valve unit indicated by reference numeral 11' in FIG. 6 (for example, see Patent Literature 1 below).

In the control valve 1' with such a configuration, when current is flowed through a solenoid portion including a coil, a stator, an attractor, and the like of the electromagnetic actuator, the plunger is attracted by the attractor, and along with this, the valve element is moved in the direction to close the valve such that it follows the plunger by the urging force of a valve-closing spring. Meanwhile, the suction pressure Ps introduced from the compressor 100 via the Ps introduction port is introduced into the pressure-sensitive chamber through an inlet/outlet chamber via a gap formed between the plunger and a guide pipe arranged around the outer periphery of the plunger or the like. Then, the pressure-sensitive reaction member (e.g., a bellows device) is expansively or contractively displaced in accordance with the pressure (i.e., the suction pressure Ps) in the pressure-sensitive chamber (i.e., contracts if the suction pressure Ps is high, and expands if it is low), and the displacement (i.e., urging force) is then transmitted to the valve element, whereby the valve element portion of the valve element moves up or down with respect to the valve orifice to regulate the valve opening of the valve unit 11'. That is, the valve opening is determined by the force of attracting the plunger with the solenoid portion, urging force (i.e., expansion or contraction force) that acts with the expansive or contractive displacement of the pressure-sensitive reaction member, and the urging force of a plunger spring (i.e., a valve-opening spring) and the valve-closing spring. The pressure Pc in the crank chamber 104 (hereinafter also referred to as "crank chamber pressure Pc" or simply referred to as "pressure Pc") is controlled in accordance with the valve opening.

In response to the aforementioned variable-capacity compressor, an improved variable-capacity swash plate compressor, such as the one schematically shown in FIGS. 7A and 7B, for example, has already been proposed that is intended to reduce the time required to increase the discharge capacity at the compressor actuation time, and suppress or reduce a decrease in the operation efficiency of the compressor at the normal control time.

A control valve 2' used for such an improved variable-capacity swash plate compressor 200 has a valve element (i.e., a valve stem) including a main valve element and a sub valve element, and has an in-valve release passage 16' in the main valve element. The control valve 2' basically has a valve body that includes a valve chamber with a valve orifice, a Ps inlet/outlet port communicating with a suction chamber 107 of the compressor 200, a Pd introduction port arranged upstream of the valve orifice and communicating with a discharge chamber 106 of the compressor 200, and a Pc inlet/outlet port arranged downstream of the valve orifice and communicating with a crank chamber 104 of the compressor 200; a main valve element for opening or closing the valve orifice; an electromagnetic actuator with a plunger for moving the main valve element in the direction to open or close the valve orifice; a pressure-sensitive chamber that receives the suction pressure Ps from the compressor 200 via the Ps inlet/outlet port; and a pressure-sensitive reaction member that urges the main valve element in the direction to open or close the valve orifice in accordance with the pressure in the pressure-sensitive chamber. Further, the in-valve release passage 16' for releasing the pressure Pc in the crank chamber 104 to the suction chamber 107 of the compressor 200 via the Ps inlet/outlet port is provided in the main valve element, and the sub valve element for opening or closing the in-valve release passage 16' is also provided so that when the plunger is continuously moved upward from the lowest position by the attraction force of the electromagnetic actuator, the sub valve element moves upward together with the plunger while closing the in-valve release passage 16', and the main valve element is also moved upward so as to follow the sub valve element. Then, after the valve orifice is closed by the main valve element, if the plunger is further moved upward, the sub valve element is configured to open the in-valve release passage 16'. The main valve element and the valve orifice form a main valve unit indicated by reference numeral 11' in FIGS.

7A and 7B, while the sub valve element and the in-valve release passage form a sub valve unit indicated by reference numeral 12' (for example, see Patent Literature 2 below).

At the normal control time (Pd→Pc control time) of the control valve 2' with such a configuration, when current is flowed through a solenoid portion including a coil, a stator, an attractor, and the like of the electromagnetic actuator, the plunger is attracted by the attractor, and along with this, the sub valve element moves upward integrally with the plunger, and following the movement of the sub valve element, the main valve element is moved in the direction to close the valve by the urging force of a valve-closing spring. Meanwhile, the suction pressure Ps introduced from the compressor 200 via the Ps inlet/outlet port is introduced into the pressure-sensitive chamber through an inlet/outlet chamber via a horizontal hole in the plunger or the like, and the pressure-sensitive reaction member (e.g., a bellows device) is expansively or contractively displaced in accordance with the pressure (i.e., the suction pressure Ps) in the pressure-sensitive chamber (i.e., contracts if the suction pressure Ps is high, and expands if it is low), and the displacement (i.e., urging force) is then transmitted to the main valve element, whereby the main valve element portion of the main valve element moves up or down with respect to the valve orifice to regulate the valve opening of the main valve unit 11'. That is, the valve opening is determined by the force of attracting the plunger with the solenoid portion, urging force (i.e., expansion or contraction force) that acts with the expansive or contractive displacement of the pressure-sensitive reaction member, the urging force of a plunger spring (i.e., a valve-opening spring) and the valve-closing spring, and force that acts on the main valve element in the valve opening direction and in the valve closing direction. The pressure Pc in the crank chamber 104 is controlled in accordance with the valve opening. In such a case, the main valve element is always urged upward by the urging force of the valve-closing spring, while the sub valve element is always urged downward by the urging force of the valve-opening spring. Thus, the sub valve unit 12' is closed and the in-valve release passage 16' is blocked in the main valve element. Therefore, there is no possibility that the crank chamber pressure Pc may be released to the suction chamber 107 via the in-valve release passage 16'.

In contrast, at the compressor actuation time, current is flowed through the solenoid portion so that the plunger is attracted by the attractor and the sub valve element moves upward together with the plunger. Following the upward movement of the sub valve element, the main valve element is moved in the direction to close the valve by the urging force of the valve-closing spring, and after the valve orifice is closed by the main valve element portion of the main valve element, the plunger is further moved upward, whereby the sub valve element opens the in-valve release passage 16'. Then, the crank chamber pressure Pc is released to the suction chamber 107 via two passages that are an in-compressor release passage 108 and the in-valve release passage 16' (for details, see Patent Literature 2 below and the like).

CITATION LIST

Patent Literature

Patent Literature 1: JP 2010-185285 A
Patent Literature 2: JP 2013-130126 A

SUMMARY OF INVENTION

Technical Problem

By the way, although various developments aiming at reducing the size of control valves have been conducted, if the diameter (i.e., the hole diameter) of the in-valve release passage in the variable-capacity compressor control valve 2' descried in Patent Literature 2 is increased to secure a certain flow rate to improve the actuation property, the outside diameter of the sub valve element, which is adapted to open or close the in-valve release passage, becomes large, and in turn, the inside diameter of the cylindrical plunger externally arranged around the sub valve element also becomes large. Thus, an area (i.e., a magnetic path area) of the upper end portion (i.e., the upper end face) of the plunger that is opposite the attractor inevitably becomes small, which is problematic in that the attraction force of the electromagnetic actuator would decrease and thus that the size (in particular, the size of the coil portion of the electromagnetic actuator) is difficult to reduce.

The present invention has been made in view of the foregoing, and it is an object of the present invention to provide a variable-capacity compressor control valve with a simple configuration that can increase the attraction force of an electromagnetic actuator and thus can reduce the size of the control valve.

Solution to Problem

In order to achieve the aforementioned object, a variable-capacity compressor control valve in accordance with the present invention basically includes a valve body including a valve chamber with a valve orifice, a Ps inlet/outlet port communicating with a suction chamber of a compressor, a Pd introduction port arranged upstream of the valve orifice and communicating with a discharge chamber of the compressor, and a Pc inlet/outlet port arranged downstream of the valve orifice and communicating with a crank chamber of the compressor; a main valve element adapted to open or close the valve orifice; an electromagnetic actuator including a plunger and an attractor, the electromagnetic actuator being adapted to move the main valve element in a direction to open or close the valve orifice; a pressure-sensitive chamber adapted to receive a suction pressure Ps from the compressor via the Ps inlet/outlet port; and a pressure-sensitive reaction member adapted to urge the main valve element in the direction to open or close the valve orifice in accordance with a pressure in the pressure-sensitive chamber. The main valve element includes an in-valve release passage for releasing a pressure Pc in the crank chamber to the suction chamber of the compressor via the Ps inlet/outlet port. A sub valve element adapted to open or close the in-valve release passage is provided. One or more magnetic bodies made of the same magnetic material as or a different magnetic material from that of the plunger are fitted in and fixed to the plunger in order to increase the attraction force of the electromagnetic actuator.

In a preferred aspect, the magnetic body is a cylindrical member.

In further another preferred aspect, the plunger has a cylindrical shape, and the magnetic body is securely inserted in the plunger.

In still another preferred aspect, the magnetic body is press-fitted in and fixed to the plunger.

In yet another preferred aspect, the magnetic body is adapted to be used as the sub valve element.

In another preferred aspect, a projected area of the lower face of the attractor with respect to the horizontal plane is equal to a projected area of the upper faces of the magnetic body and the plunger with respect to the horizontal plane.

Advantageous Effects of Invention

According to the variable-capacity compressor control valve in accordance with the present invention, since one or more magnetic bodies made of the same magnetic material as or a different magnetic material from that of the plunger are fitted in and fixed to the plunger, a magnetic path area can be secured and the attraction force of an electromagnetic actuator can be increased. Therefore, a reduction in the size (in particular, a reduction in the size of the coil portion of the electromagnetic actuator) can be achieved.

In addition, a projected area (i.e., an area corresponding to a magnetic path area) of the lower face (i.e., a face that is opposite the plunger) of the attractor with respect to the horizontal plane is equal to a projected area (i.e., an area corresponding to a magnetic path area) of the upper faces (i.e., faces that are opposite the attractor) of the magnetic body and the plunger with respect to the horizontal plane. This can also increase the attraction force of the electromagnetic actuator without increasing the body size. Therefore, a further reduction in the size (in particular, a reduction in the size of the coil portion of the electromagnetic actuator) can be achieved.

DESCRIPTION OF EMBODIMENTS

Hereinafter, embodiments of the present invention will be described with reference to the drawings.

Figure 1:
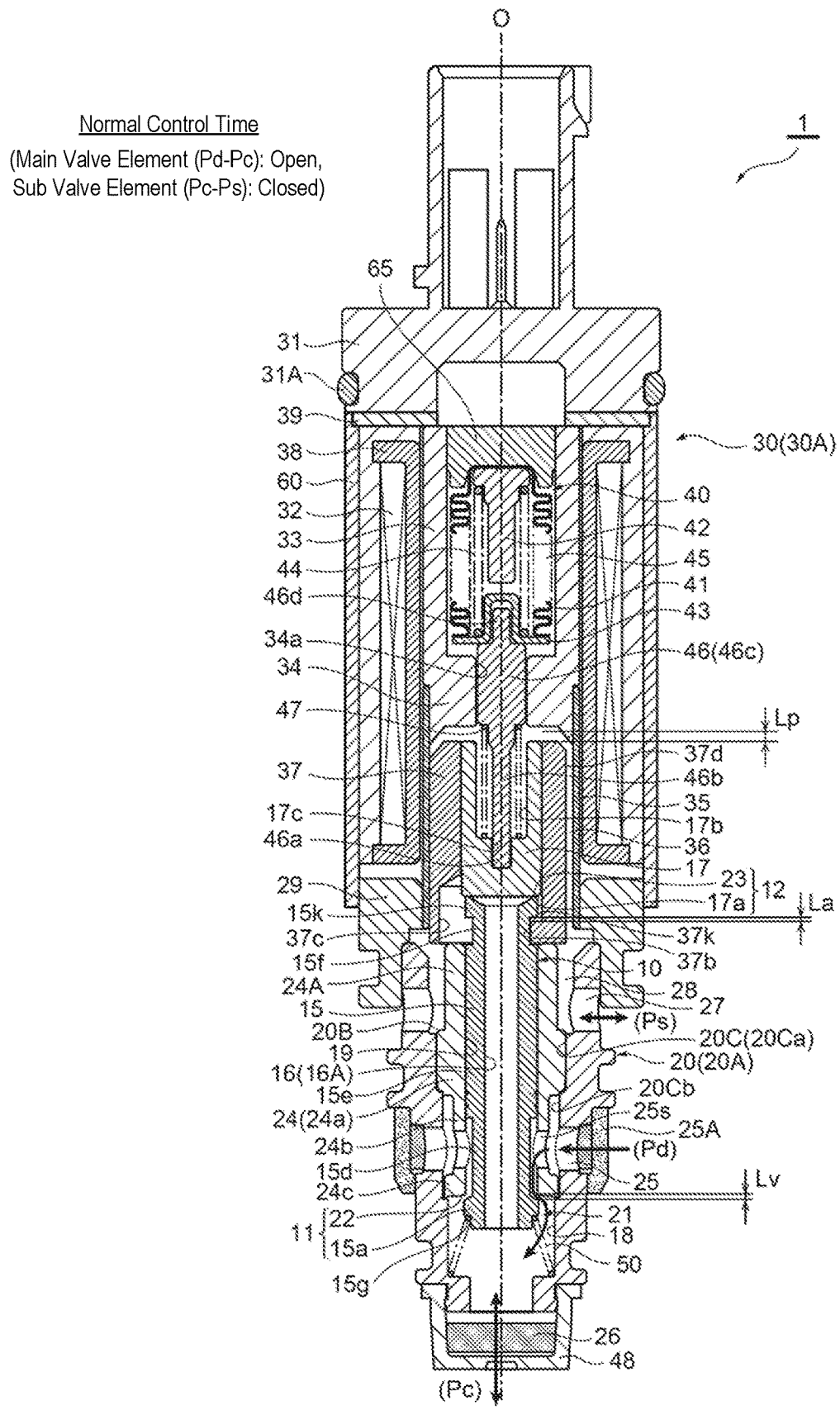
FIG. 1 is a longitudinal sectional view showing an embodiment of the variable-capacity compressor control valve in accordance with the present invention in which the main valve element is in the open position and the sub valve element is in the closed position (i.e., at the normal control time).
Figure 2:
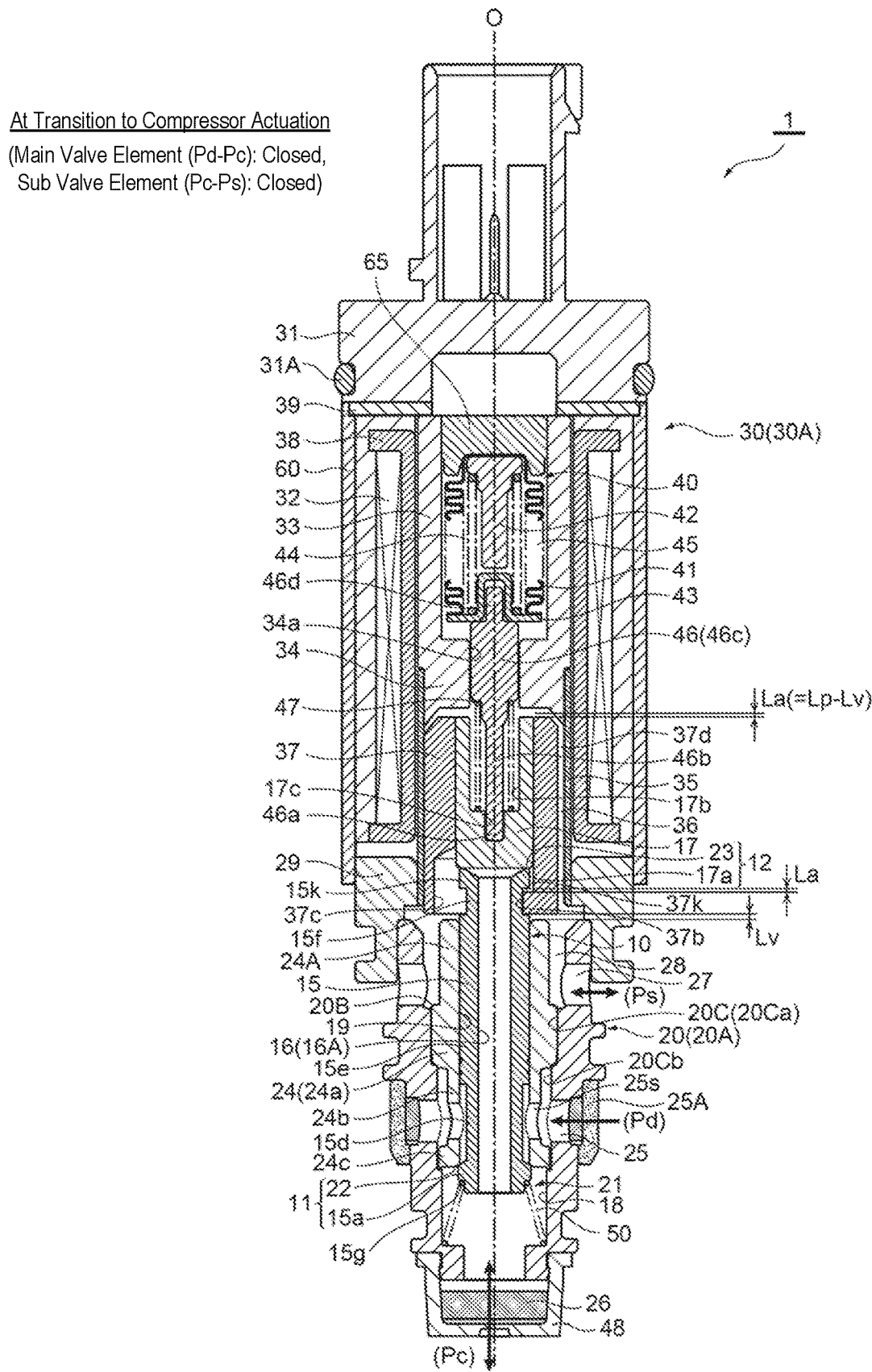
FIG. 2 is a longitudinal sectional view showing an embodiment of the variable-capacity compressor control valve in accordance with the present invention in which the main valve element is in the closed position and the sub valve element is in the closed position (i.e., at the time of transition to compressor actuation).
Figure 3:
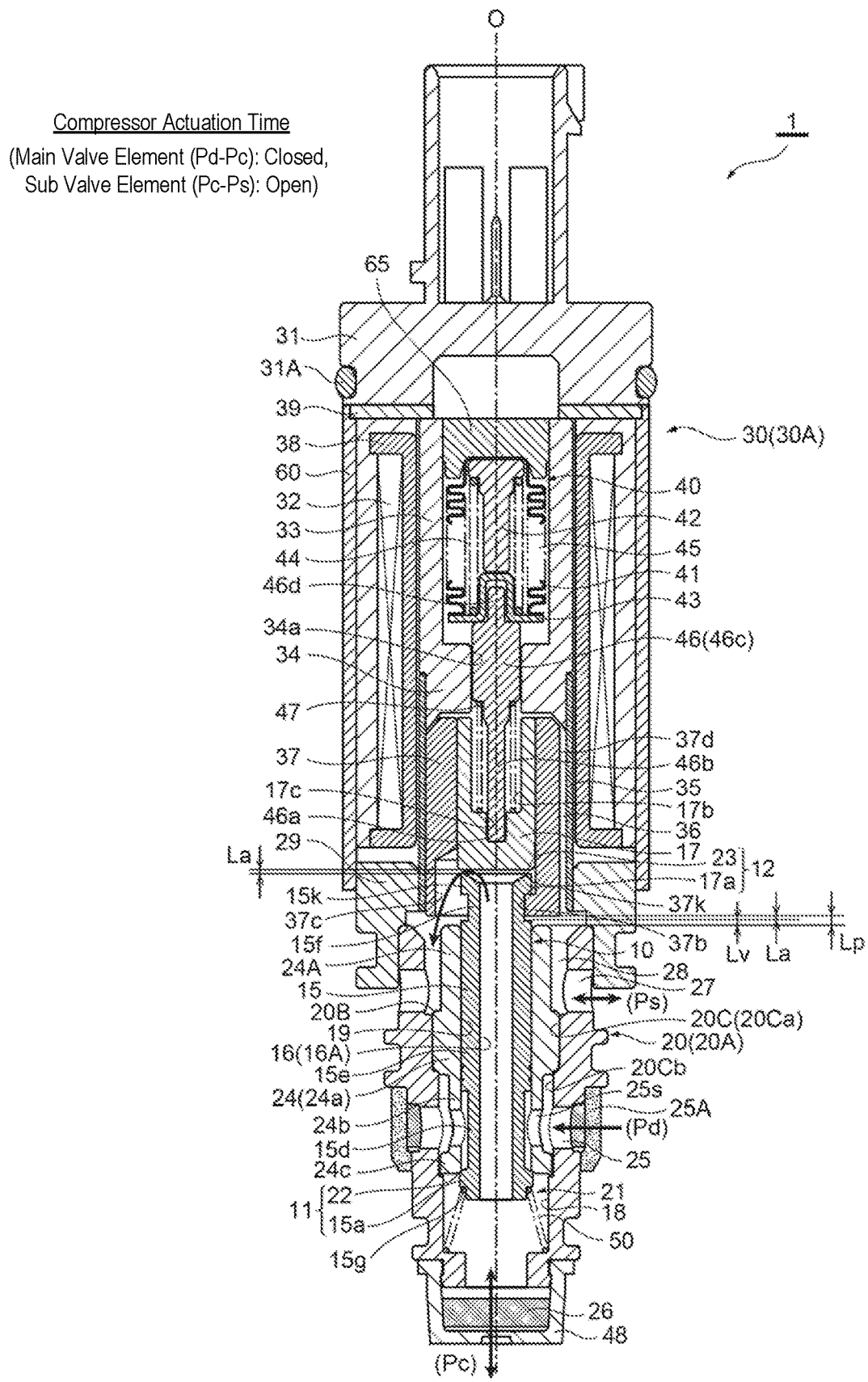
FIG. 3 is a longitudinal sectional view showing an embodiment of the variable-capacity compressor control valve in accordance with the present invention in which the main valve element is in the closed position and the sub valve element is in the open position (i.e., at the compressor actuation time).
Figure 4A:
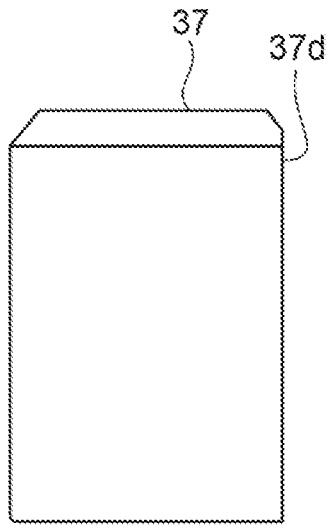
FIG. 4A is a front view of a plunger and a sub valve element used for an embodiment of the variable-capacity compressor control valve in accordance with the present invention.
Figure 4B:
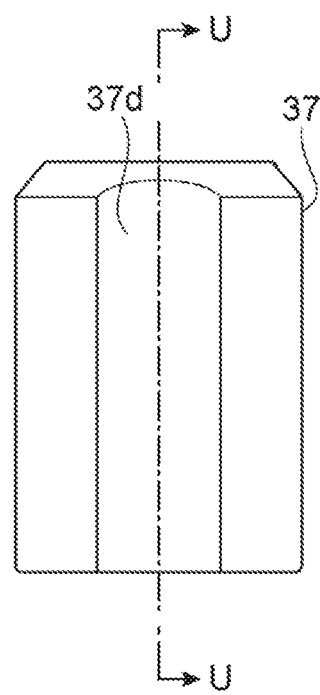
FIG. 4B is a right-side view of the plunger and the sub valve element used for an embodiment of the variable-capacity compressor control valve in accordance with the present invention.
Figure 4C:
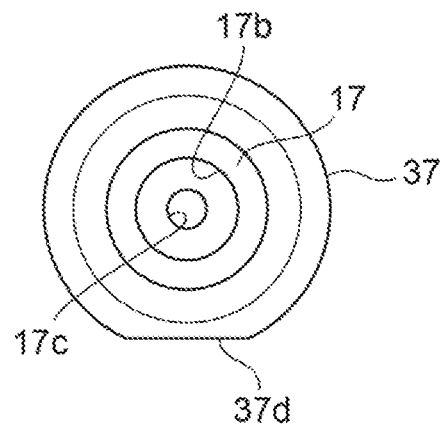
FIG. 4C is a top view of FIG. 4B.
Figure 4D:
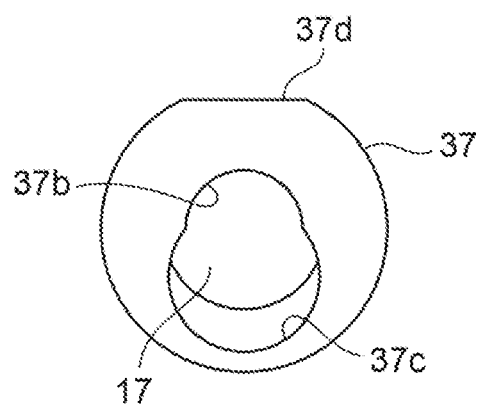
FIG. 4D is a bottom view of FIG. 4B.
Figure 4E:
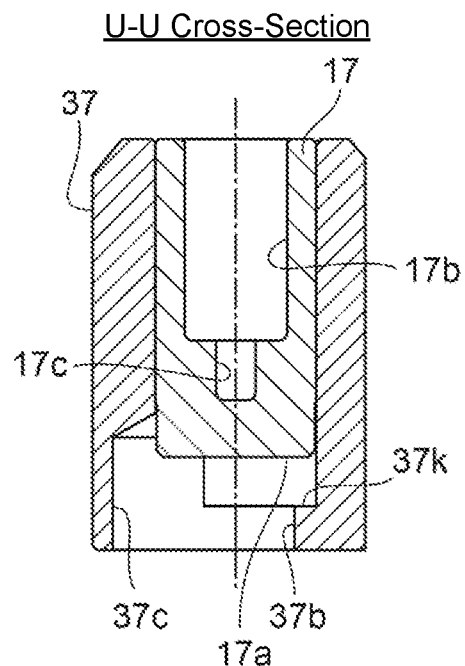
FIG. 4E is a sectional view in the direction of the arrow U-U in FIG. 4B.

FIGS. 1 to 3 are longitudinal sectional views each showing an embodiment of the variable-capacity compressor control valve in accordance with the present invention. Specifically, FIG. 1 is a view in which the main valve element is in the open position and the sub valve element is in the closed position (i.e., at the normal control time), FIG. 2 is a view in which the main valve element is in the closed position and the sub valve element is in the closed position (i.e., at the time of transition to compressor actuation), and FIG. 3 is a view in which the main valve element is in the closed position and the sub valve element is in the open position (i.e., at the compressor actuation time).

It should be noted that in the present specification, descriptions indicating the positions or directions, such as upper, lower, top, bottom, left, right, front, and rear, are used for the sake of convenience in accordance with the drawings to avoid complexity in the description, but such descriptions do not necessarily indicate the actual positions or directions when the control valve of the present invention is incorporated into a compressor.

In addition, in each drawing, a gap formed between some members, a clearance between some members, and the like may be depicted larger or smaller than their actual dimensions to help understand the present invention and also for the sake of convenience to create the drawing.

[Configuration of Control Valve]

A control valve 1 in the shown embodiment has a valve body 20 with a valve orifice 22; a valve element 10 with a main valve element 15 for opening or closing the valve orifice 22; an electromagnetic actuator 30 for moving the valve element 10 (i.e., the main valve element 15) in the direction to open or close the valve orifice (i.e., in the vertical direction); and a bellows device 40 as a pressure-sensitive reaction member.

The electromagnetic actuator 30 includes a bobbin 38, an energization coil 32 wound around the bobbin 38, a stator 33 and an attractor 34 arranged on the inner peripheral side of the coil 32, a guide pipe 35 whose upper end portion is joined by welding to the outer periphery of the lower end portion (i.e., a step portion) of the stator 33 and the attractor 34, a cylindrical plunger 37 having a bottom and arranged such that it is vertically slidable on the inner peripheral side of the guide pipe 35 below the attractor 34, a cylindrical housing 60 externally arranged around the coil 32, a connector head 31 attached to the upper side of the housing 60 with an attachment plate 39 interposed therebetween, and a holder 29 arranged between the lower end portion of the housing 60 and the lower end portion of the guide pipe 35 and adapted to fix them to the upper portion of the valve body 20. In this example, the attractor 34 with a cylindrical shape and having an insertion through-hole 34a, which has a smaller diameter than the inside diameter of the stator 33, formed in the center (along the axial line O) of the attractor 34 is integrally molded with the inner periphery of the lower portion of the cylindrical stator 33. In addition, an O-ring 31A, which is a sealing member, is attached to the outer periphery of the connector head 31 (or an annular attachment groove formed therein). Herein, a portion of the electromagnetic actuator 30 including the coil 32, the stator 33, the attractor 34, and the like and excluding the plunger 37 is referred to as a "solenoid portion 30A."

A stator 65 with a short columnar shape is securely attached to the upper portion of the stator 33 by press fitting or the like, and a pressure-sensitive chamber 45, which receives a suction pressure Ps in a compressor 100, is formed between the stator 65 on the inner peripheral side of the stator 33 and the attractor 34. The pressure-sensitive chamber 45 has arranged therein the bellows device 40 as the pressure-sensitive reaction member that includes bellows 41, a downwardly projecting upper stopper 42, an upwardly recessed lower stopper 43, and a compression coil spring 44. Further, a stepped, bar-like pushrod 46, which is a thrust transmitting member, is disposed along the axial line O below the bellows device 40. The pushrod 46 includes an upper small-diameter portion 46d, an intermediate waist portion (i.e., a sliding portion) 46c, and a lower small-diameter portion 46b in this order from the top side. The upper small-diameter portion (i.e., an end portion on the side opposite to the sub valve element 17) 46d of the pushrod 46 is fitted and inserted in the recess of the lower stopper 43 and thus is supported therein, and the intermediate waist portion 46c of the pushrod 46 is slidably inserted in the insertion through-hole 34a of the attractor 34. The lower small-diameter portion 46b of the pushrod 46 is inserted in the recess hole 17b of the sub valve element 17 with a recessed cross section described below, and a lower end portion 46a of the pushrod 46 is fitted in a fit-insertion hole 17c formed in the center of the bottom of the recess hole 17b.

The sub valve element 17 with a recessed cross section and having the recess hole 17b, which is vertically long and has approximately the same diameter as that of the insertion through-hole 34a of the attractor 34, is securely inserted into the plunger 37 by press fitting or the like. The upper end portion of the sub valve element 17 is aligned with the upper end portion of the plunger 37 (that is, the upper end portion of the sub valve element 17 is positioned with respect to the inner periphery of the upper end portion of the plunger 37), while the lower end portion of the sub valve element 17 is fitted into the plunger 37 with a clearance secured between the lower end portion of the sub valve element 17 and the bottom of the plunger 37 (with a clearance that allows the flanged latch portion 15k of the main valve element 15 to slightly move vertically, which will be described in detail later). The fit-insertion hole 17c, which is recessed and adapted to have fit-inserted therein the lower end portion 46a of the pushrod 46 (or the lower small-diameter portion 46b thereof), is formed in the center of the bottom of the recess hole 17b of the sub valve element 17.

In addition, a plunger spring (i.e., a valve-opening spring) 47, which is a cylindrical compression coil spring adapted to urge the sub valve element 17 and the plunger 37 downward (i.e., in the direction to open the valve), is provided in a compressed state between a step portion (i.e., an annular terrace face facing downward) formed between the upper small-diameter portion 46d and the intermediate waist portion 46c of the pushrod 46, and the bottom of the recess hole 17b (i.e., a face thereof facing upward around the fit-insertion hole 17c) of the sub valve element 17 such that the plunger spring 47 is arranged around the lower small-diameter portion 46b of the pushrod 46. The plunger spring 47 allows the sub valve element 17 to move vertically together with the plunger 37 in a state in which the sub valve element 17 is urged downward. With the plunger spring 47 (or the compression force thereof), the sub valve element 17 is urged in the direction to close an in-valve release passage 16 described below, and the bellows device 40 is held within the pressure-sensitive chamber 45 via the pushrod 46.

Further, as is clear from FIGS. 4A to 4E, a central hole 37b with a smaller diameter than the inside diameter of the plunger 37 is formed in the center (along the axial line O) of the bottom of the plunger 37, and an insertion hole 37c with substantially the same diameter as the inside diameter of the plunger 37 (in other words, a larger diameter than that of the central hole 37b) is formed in a position eccentric with respect to the center of the bottom of the plunger 37 such that the insertion hole 37c partially overlaps the central hole 37b. The insertion hole 37c is formed to the depth (i.e., the depth in the vertical direction) to communicate with the internal space of the plunger 37. The diameter of the insertion hole 37c (i.e., the inside diameter of the plunger 37 and the outside diameter of the sub valve element 17) is set slightly larger than that of the flanged latch portion 15k of the main valve element 15 described below, and the diameter of the central hole 37b is set slightly larger than that of the upper small-diameter portion 15f of the main valve element 15 and slightly smaller than that of the flanged latch portion 15k, and further, the outer peripheral portion of the central hole 37b on the upper face of the bottom of the plunger 37 is an inner flanged latch portion 37k to which the flanged latch portion 15k of the main valve element 15 is adapted to be latched. The distance (in the vertical direction) between the bottom (or the upper face thereof) of the plunger 37 and the lower end portion (i.e., a planar face) of the sub valve element 17 is set slightly larger than the height of the flanged latch portion 15k of the main valve element 15, and the thickness (i.e., the height in the vertical direction) of the bottom of the plunger 37 is set slightly larger than the height of the upper small-diameter portion 15f of the main valve element 15 so that the main valve element 15 is vertically movable with respect to the plunger 37 (which will be described in detail later).

In this example, a D-cut surface 37d is formed in a predetermined position on the outer periphery of the plunger 37, and a gap 36 is formed between the outer periphery of the plunger 37 (or the D-cut surface 37d thereof) and the guide pipe 35. It should be noted that instead of the D-cut surface 37d, one or more vertical grooves may be formed so that the gap 36 is formed between the outer periphery of the plunger 37 and the guide pipe 35.

The valve element 10 has the stepped, shaft-like main valve element 15 and the aforementioned sub valve element 17 arranged side by side in the vertical direction (along the direction of the axial line O).

The main valve element 15 arranged on the lower side is produced from a non-magnetic material and has, sequentially arranged from the bottom side, a main valve element portion 15a, an intermediate small-diameter portion 15d, a relatively long fit-inserted portion 15e, the upper small-diameter portion 15f, and the flanged latch portion 15k. A release through-hole 16A partially forming the in-valve release passage 16 is provided in the center of the main valve element 15 such that it penetrates through the center of the main valve element 15 in the vertical direction. The upper end portion (i.e., an inverted truncated cone surface portion) of the release through-hole 16A is a sub valve seat portion 23 with/from which a lower end portion (i.e., a sub valve element portion) 17a of the sub valve element 17 is moved into contact or away.

The upper small-diameter portion 15f of the main valve element 15 is loosely fitted in the central hole 37b, and the flanged latch portion 15k of the main valve element 15 has a larger diameter than that of the central hole 37b (and a smaller diameter than the inside diameter of the plunger 37) so that when the plunger 37 is moved upward with respect to the main valve element 15, the flanged latch portion 15k is latched to the inner flanged latch portion 37k that is formed by the outer peripheral portion of the central hole 37b, and thus, latching is achieved and slippage is prevented.

The sub valve element 17 is, as described above, securely inserted in the plunger 37 above the main valve element 15. The outside diameter of the sub valve element 17 (=the inside diameter of the plunger 37) is larger than the outside diameter of the flanged latch portion 15k of the main valve element 15, and the lower end portion (i.e., a planar face) of the sub valve element 17 is the sub valve element portion 17a that moves into contact with or away from the sub valve seat portion 23, which is the upper end edge of the release through-hole 16A, so as to open or close the in-valve release passage 16. Herein, the sub valve seat portion 23 and the sub valve element portion 17a form a sub valve unit 12.

The sub valve element 17 may be formed using the same magnetic material as or a different magnetic material from that of the plunger 37 that is made of a magnetic material. If the sub valve element 17 is formed using a different magnetic material from that of the plunger 37, that is, using a magnetic material with a different magnetic force, the attraction force property of the electromagnetic actuator 30 can be appropriately adjusted.

Herein, although the sub valve element 17 is a single member (or a single component), the sub valve element 17 may also be a plurality of members put together.

In order to attach the valve element 10 (i.e., the main valve element 15 and the sub valve element 17) and the plunger 37 together, for example, the sub valve element 17 may be fixed to the plunger 37 (in a predetermined position inside the plunger 37) by press fitting or the like, and the flanged latch portion 15k and the upper small-diameter portion 15f of the main valve element 15, which has been attached to the valve body 20 (or a guide hole 19 therein) in advance, may be inserted into the insertion hole 37c of the plunger 37 from the bottom side, and then, the main valve element 15 may be moved horizontally with respect to the plunger 37, and further, the upper small-diameter portion 15f of the main valve element 15 may be inserted into the central hole 37b provided in the center of the bottom of the plunger 37 so that the main valve element 15 (or the flanged latch portion 15k thereof) is arranged below the sub valve element 17.

Meanwhile, the valve body 20 has a two-split structure that includes a body member 20A having a fit recess hole 20C in the center of the upper portion thereof, and a support member 20B that is securely inserted into the recess hole 20C by press fitting or the like.

The support member 20B is produced from a material with relatively high hardness, such as stainless steel (SUS), and has a protruding stopper portion 24A for defining the lowest position of the plunger 37, on the upper side of a fit-inserted portion 24 that is fitted and inserted in the recess hole 20C. The fit-inserted portion 24 has a step formed thereon, and at a position below an upper large-diameter portion 24a, a lower small-diameter portion 24b, which is longer than the upper large-diameter portion 24a in the vertical direction, is provided, and at the lower end of the lower small-diameter portion 24b, a flanged abutment portion 24c, which is adapted to abut a step portion (i.e., a terrace face) between the recess hole 20C of the body member 20A and a housing hole 18, is provided such that it protrudes outward. In addition, the guide hole 19 in which the fit-inserted portion 15e of the main valve element 15 is adapted to be slidably fitted and inserted is formed in the center of the support member 20B such that it penetrates through the support member 20B in the vertical direction, and the lower end portion of the guide hole 19 is the valve orifice 22 (i.e., the valve seat portion) that is opened or closed by the main valve element portion 15a of the main valve element 15. Herein, the main valve element portion 15a and the valve orifice 22 form a main valve unit 11. Since the support member 20B is produced from a material with high hardness, such as stainless steel, as described above, the specific gravity of the support member 20B is also high.

The body member 20A is produced from a material, such as aluminum, brass, or resin, that has relatively low specific gravity (that is, a material with relatively low hardness) as compared to stainless steel and the like. An inlet/outlet chamber 28 for the suction pressure Ps in the compressor 100 is formed around the outer periphery of the stopper portion 24A, and a plurality of Ps inlet/outlet ports 27 are formed on the outer peripheral side of the inlet/outlet chamber 28 in a state in which the support member 20B (or the fit-inserted portion 24 thereof) is inserted in the recess hole 20C of the body member 20A. The suction pressure Ps introduced into the inlet/outlet chamber 28 through the Ps inlet/outlet ports 27 is introduced into the pressure-sensitive chamber 45 via the gap 36 (in this example, a gap formed by the D-cut surface 37d) formed between the outer periphery of the plunger 37 and the guide pipe 35, and the like.

Meanwhile, the recess hole 20C of the body member 20A also has a step formed thereon, and includes an upper large-diameter hole 20Ca in which the upper large-diameter portion 24a of the support member 20B is fitted and inserted, and a lower small-diameter hole 20Cb in which the lower small-diameter portion 24b is fitted and inserted. The outer periphery of the upper large-diameter portion 24a abuts the inner periphery of the upper large-diameter hole 20Ca (that is, the upper large-diameter portion 24a is fitted in (i.e., fits snugly inside) the upper large-diameter hole 20Ca), and the support member 20B is securely inserted in the recess hole 20C of the body member 20A in a posture in which a small gap is provided between the outer periphery of the lower small-diameter portion 24b and the inner periphery of the lower small-diameter hole 20Cb. In addition, the stepped housing hole 18 for housing the main valve element portion 15a of the main valve element 15 is provided continuously with the center of the bottom of the lower small-diameter hole 20Cb. A valve-closing spring 50, which is a conical compression coil spring, is provided in a compressed state between the step portion provided on the inner periphery of the housing hole 18 and a step portion (i.e., a terrace face) 15g provided on the outer periphery of the lower portion of the main valve element portion 15a of the main valve element 15. Thus, with the urging force of the valve-closing spring 50, the main valve element 15 (or a step portion between the fit-inserted portion 15e and the upper small-diameter portion 15f thereof) is pressed against the plunger 37 (or the bottom thereof).

The inside of the housing hole 18 (i.e., a portion below the valve orifice 22 of the support member 20B) is the valve chamber 21. A plurality of Pd introduction ports 25 communicating with a discharge chamber 106 of the compressor 100 are provided in the lower small-diameter hole 20Cb of the recess hole 20C, and a ring-like filter member 25A is arranged around the outer periphery of the Pd introduction ports 25. In addition, a plurality of horizontal holes 25s communicating with the Pd introduction ports 25 are provided in the lower small-diameter portion 24b of the fit-inserted portion 24.

In addition, the lower end portion of the body member 20A has a lid-like member 48, which functions as a filter, fixed thereto by engagement, press fitting, or the like. A Pc inlet/outlet chamber (or inlet/outlet port) 26, which communicates with a crank chamber 104 of the compressor 100, is provided above the lid-like member 48 and below the housing hole 18. The Pc inlet/outlet chamber (or inlet/outlet port) 26 communicates with the Pd introduction ports 25 via the valve chamber 21→the gap between the valve orifice 22 and the main valve element portion 15a→the gap between the lower portion of the guide hole 19 and the intermediate small-diameter portion 15d→the horizontal holes 25s of the lower small-diameter portion 24b→the gap between the lower small-diameter portion 24b and the lower small-diameter hole 20Cb.

In addition, in this embodiment, the release through-hole 16A formed in the main valve element 15, the central hole 37b and the insertion hole 37c provided in the plunger 37, the inlet/outlet chamber 28, and the like form the in-valve release passage 16 for releasing the pressure Pc in the crank chamber 104 to a suction chamber 107 of the compressor 100 via the Ps inlet/outlet ports 27. The in-valve release passage 16 is adapted to be opened or closed as the sub valve element portion 17a of the sub valve element 17 is moved into contact with or away from the sub valve seat portion 23 that is the upper end edge of the release through-hole 16A of the main valve element 15.

Herein, in the control valve 1 of this embodiment, when the plunger 37, the main valve element 15, and the sub valve element 17 are at the lowest position (i.e., when the bottom end face of the plunger 37 abuts the stopper portion 24A, the main valve unit 11 is in the fully open position, and the sub valve unit 12 is in the fully closed position) as shown in FIG. 1, a clearance in the vertical direction between the main valve element portion 15a of the main valve element 15 and the valve orifice 22 (i.e., the valve seat portion) is represented by a first lift amount Lv, and a clearance between the inner flanged latch portion 37k of the plunger 37 and the flanged latch portion 15k of the main valve element 15 is represented by a predetermined amount La. The maximum lift amount (i.e., a second lift amount) Lp of the plunger 37 (i.e., the lift amount of from the lowest position to the highest position of the plunger 37) corresponds to the first lift amount Lv+the predetermined amount La.

[Operation of Control Valve]

Next, the operation of the control valve 1 with the aforementioned configuration will be schematically described.

At the normal control time (i.e., Pd→Pc control time), the lift amount of the plunger 37 (and the sub valve element 17) is slightly greater than the first lift amount Lv at the maximum, and at the compressor actuation time (i.e., Pc→Ps control time), the lift amount of the plunger 37 (and the sub valve element 17) is the second lift amount Lp.

That is, at the normal control time (i.e., Pd→Pc control time), when the solenoid portion 30A including the coil 32, the stator 33, the attractor 34, and the like is supplied with current and thus is energized, the plunger 37 and the sub valve element 17 are both attracted (upward) by the attractor 34, and following the movement of the plunger 37 and the sub valve element 17, the main valve element 15 is moved upward (i.e., in the direction to close the valve) by the urging force of the valve-closing spring 50. Meanwhile, the suction pressure Ps introduced from the compressor 100 through the Ps inlet/outlet ports 27 is introduced into the pressure-sensitive chamber 45 through the inlet/outlet chamber 28 via the gap 36 between the outer periphery of the plunger 37 and the guide pipe 35, and the like, and the bellows device 40 (i.e., the inside thereof is at a vacuum pressure) is expansively or contractively displaced in accordance with the pressure (i.e., the suction pressure Ps) in the pressure-sensitive chamber 45 (i.e., contracts if the suction pressure Ps is high, and expands if it is low), and the displacement is then transmitted to the main valve element 15 via the pushrod 46, the sub valve element 17, and the like, whereby the valve opening (i.e., the clearance between the valve orifice 22 and the main valve element portion 15a) is regulated, and the pressure Pc in the crank chamber 104 is controlled in accordance with the valve opening. Along with this, the inclination angle of the swash plate 102 and the stroke of the piston 105 in the compressor 100 are controlled so as to increase or decrease the discharge capacity.

In this case, the main valve element 15 is always urged upward by the urging force of the valve-closing spring 50, while the sub valve element 17 is always urged downward by the urging force of the valve-opening spring 47. Therefore, the sub valve element portion 17a is in a state of being pressed against the sub valve seat portion 23 (i.e., the sub valve unit 12 is closed), and the in-valve release passage 16 is blocked in the main valve element 15. Therefore, there is no possibility that the crank chamber pressure Pc may be released to the suction chamber 107 via the in-valve release passage 16.

In contrast, at the compressor actuation time, the solenoid portion 30A is supplied with current and thus is energized, and the plunger 37 and the sub valve element 17 are both attracted (upward) by the attractor 34. Following the upward movement of the plunger 37 and the sub valve element 17, the main valve element 15 is also moved upward, and the valve orifice 22 is closed by the main valve element portion 15a of the main valve element 15. Then, the plunger 37 and the sub valve element 17 are further moved upward, whereby the sub valve element 17 opens the in-valve release passage 16, and thus, the pressure Pc in the crank chamber 104 is released into the suction chamber 107 via two passages that are an in-compressor release passage 108 and the in-valve release passage 16.

Specifically, until the upward movement amount of the plunger 37 (and the sub valve element 17) reaches the first lift amount Lv, the main valve element 15 is moved in the direction to close the valve by the urging force of the valve-closing spring 50 such that it follows the upward movement of the plunger 37 and the sub valve element 17. Then, when the upward movement amount reaches the first lift amount Lv, the valve orifice 22 is closed by the main valve element portion 15a of the main valve element 15 (i.e., the state shown in FIG. 2), and the plunger 37 and the sub valve element 17 are further moved upward by the predetermined amount La with the main valve unit 11 in the closed valve state (i.e., the state shown in FIG. 3). In other words, after the upward movement amount of the plunger 37 and the sub valve element 17 has reached the first lift amount Lv, the sub valve element 17 is attracted together with the plunger 37 toward the attractor 34 by the predetermined amount La until the inner flanged latch portion 37k of the plunger 37 is latched to the flanged latch portion 15k of the main valve element 15 (i.e., the first lift amount Lv+the predetermined amount La=the second lift amount Lp). In such a case, since the main valve element 15 remains still in the closed valve state, the sub valve element portion 17a of the sub valve element 17 is lifted from the sub valve seat portion 23 by the predetermined amount La, whereby the in-valve release passage 16 is opened. When the inner flanged latch portion 37k of the plunger 37 is latched to the flanged latch portion 15k of the main valve element 15, neither the plunger 37 nor the sub valve element 17 is lifted any further even if the solenoid portion 30A generates an attraction force.

Figure 5:
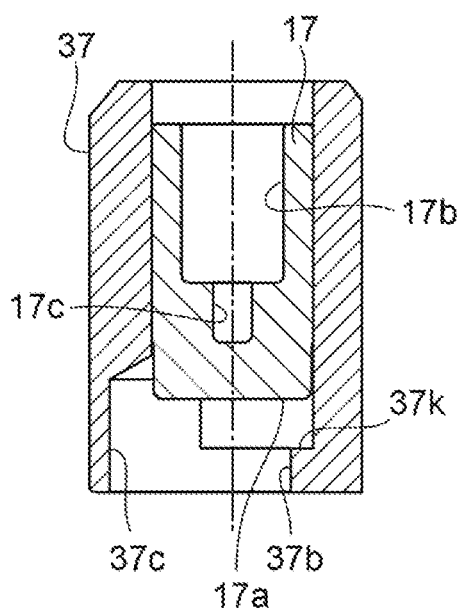
FIG. 5 is a sectional view of a modified example of the plunger and the sub valve element shown in FIGS. 4A to 4E, which is similar to FIG. 4E.
Figure 6:
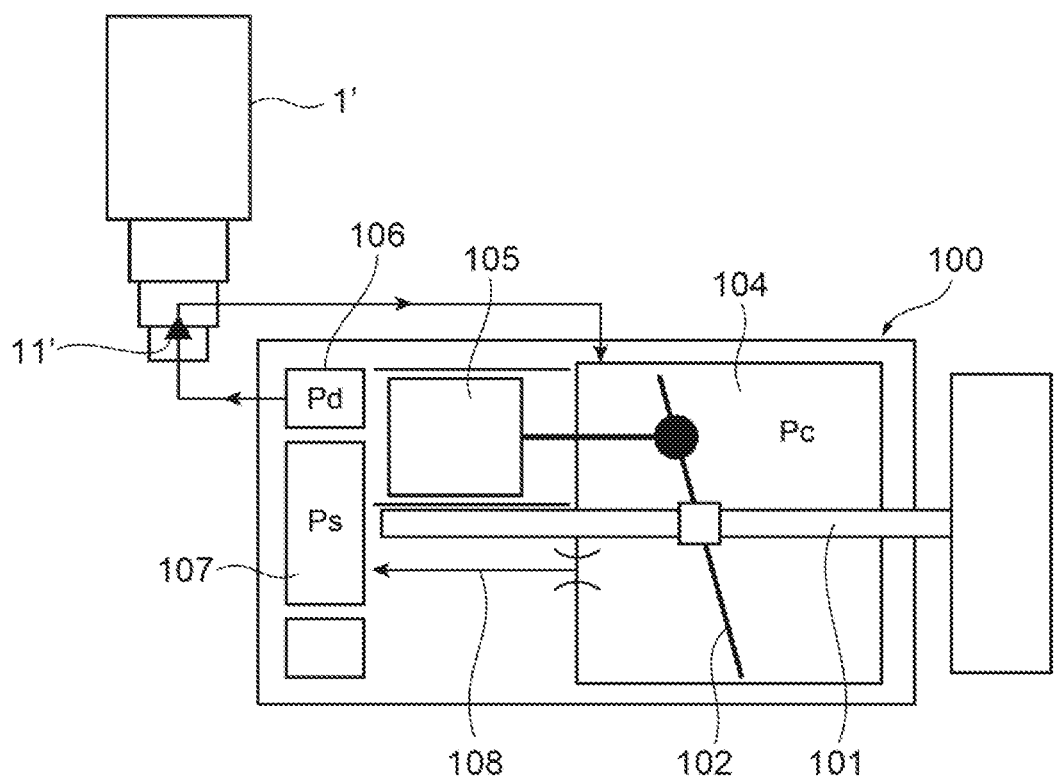
FIG. 6 is a view showing the circulation state of a refrigerant pressure between a compressor and a control valve of the first conventional art.
Figure 7A:
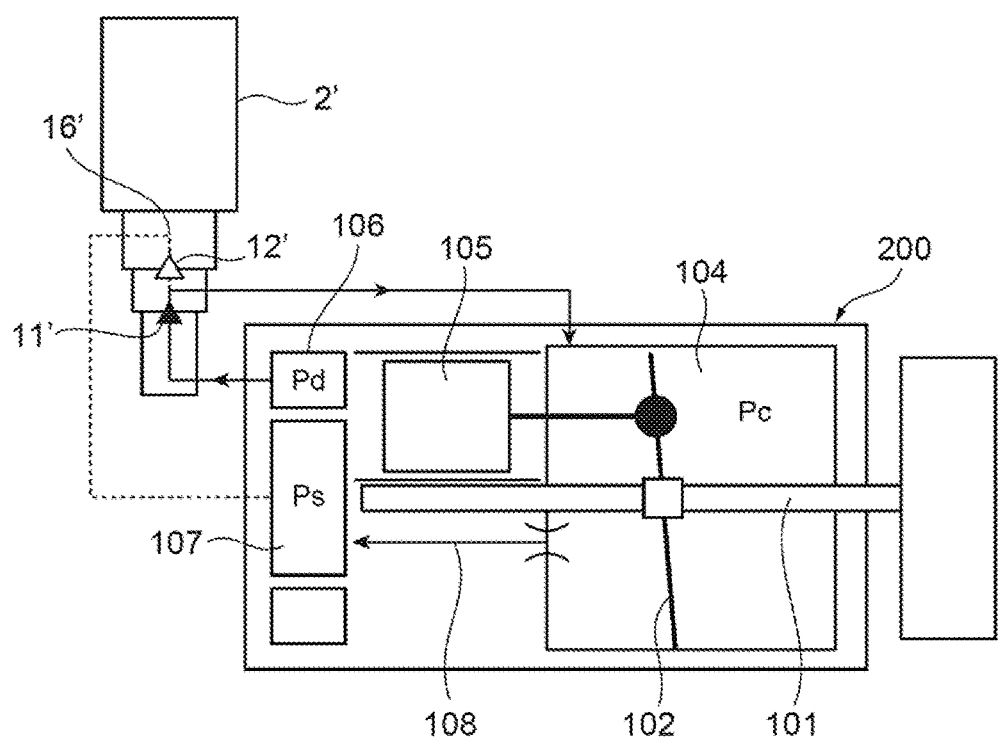
FIG. 7A is a view showing the circulation state of a refrigerant pressure between a compressor and a control valve of the second conventional art, and showing the normal control time.
Figure 7B:
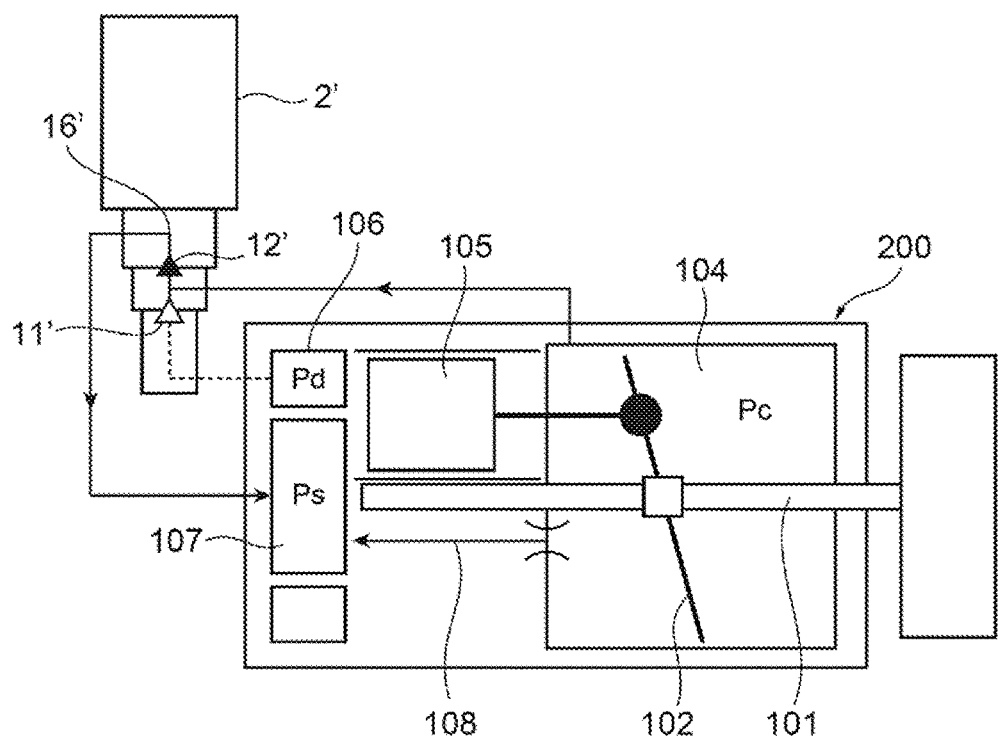
FIG. 7B is a view showing the circulation state of a refrigerant pressure between a compressor and a control valve of the second conventional art, and showing the compressor actuation time.

In this embodiment, although the sub valve element 17 is securely inserted in the plunger 37 in a state in which the upper end portion of the sub valve element 17 is aligned with the upper end portion of the plunger 37, it is also possible to change the position of the upper end portion of the sub valve element 17 with respect to the position of the upper end portion of the plunger 37 as shown in FIG. 5, for example, so as to adjust the attraction force property of the electromagnetic actuator 30.

As described above, in the variable-capacity compressor control valve 1 of this embodiment, the sub valve element 17 (which is a single member in the example shown in the drawing but may also include a plurality members), which is a magnetic body formed of the same magnetic material as or a different magnetic material from that of the plunger 37, is fitted in and fixed to the plunger 37. Therefore, a magnetic path area can be secured and the attraction force of the electromagnetic actuator 30 can be increased. Thus, a reduction in the size (in particular, a reduction in the size of the coil 32 portion of the electromagnetic actuator 30) can be achieved.

Furthermore, a projected area (i.e., an area corresponding to a magnetic path area) of the lower face (i.e., a face that is opposite the plunger 37) of the attractor 34 (i.e., a portion other than the insertion through-hole 34a) with respect to the horizontal plane is substantially equal to a projected area (i.e., an area corresponding to a magnetic path area) of the upper faces (i.e., faces that are opposite the attractor 34) of the sub valve element 17, which is the magnetic body, and the plunger 37 (specifically, the total face of the upper face of the sub valve element 17 and the upper face of the plunger 37) with respect to the horizontal plane. This can also increase the attraction force of the electromagnetic actuator 30 without increasing the body size. Therefore, a further reduction in the size (in particular, a reduction in the size of the coil 32 portion of the electromagnetic actuator 30) can be achieved.

REFERENCE SIGNS LIST

1 Variable-capacity compressor control valve
10 Valve element
11 Main valve unit
12 Sub valve unit
15 Main valve element
15a Main valve element portion
15k Flanged latch portion
16 In-valve release passage
17 Sub valve element
17a Sub valve element portion
17b Recess hole
17c Fit-insertion hole
18 Housing hole
19 Guide hole
20 Valve body
20A Body member
20B Support member
20C Recess hole
21 Valve chamber
22 Valve orifice
23 Sub valve seat portion
24 Fit-inserted portion
24A Stopper portion
25 Pd introduction port
26 Pc inlet/outlet port
27 Ps inlet/outlet port
28 Inlet/outlet chamber
30 Electromagnetic actuator
30A Solenoid portion
32 Coil
33 Stator
34 Attractor
34a Insertion through-hole
35 Guide pipe
37 Plunger
37b Central hole
37c Insertion hole
37k Inner flanged latch portion
40 Bellows device (pressure-sensitive reaction member)
45 Pressure-sensitive chamber
46 Pushrod
46a Lower end portion of pushrod
46b Lower small-diameter portion
46c Intermediate waist portion
46d Upper small-diameter portion
47 Plunger spring (compression coil spring)
50 Valve-closing spring
Lv First lift amount
La Predetermined amount
Lp Second lift amount

The invention claimed is:

1. A variable-capacity compressor control valve comprising:
a valve body including a valve chamber with a valve orifice, a Ps inlet/outlet port communicating with a suction chamber of a compressor, a Pd introduction port arranged upstream of the valve orifice and communicating with a discharge chamber of the compressor, and a Pc inlet/outlet port arranged downstream of the valve orifice and communicating with a crank chamber of the compressor;
a main valve element adapted to open or close the valve orifice;
an electromagnetic actuator including a plunger and an attractor, the electromagnetic actuator being adapted to move the main valve element in a direction to open or close the valve orifice;
a pressure-sensitive chamber adapted to receive a suction pressure Ps from the compressor via the Ps inlet/outlet port; and
a pressure-sensitive reaction member adapted to urge the main valve element in the direction to open or close the valve orifice in accordance with a pressure in the pressure-sensitive chamber,
wherein:
the main valve element includes an in-valve release passage for releasing a pressure Pc in the crank chamber to the suction chamber of the compressor via the Ps inlet/outlet port,
a sub valve element adapted to open or close the in-valve release passage is provided,
the plunger has a cylindrical shape, and
a magnetic body made of the same magnetic material as or a different magnetic material from that of the plunger is securely inserted in the plunger in order to increase an attraction force of the electromagnetic actuator.

2. The variable-capacity compressor control valve according to claim 1, wherein the magnetic body is a cylindrical member.

3. The variable-capacity compressor control valve according to claim 1, wherein the magnetic body is press-fitted in and fixed to the plunger.

4. The variable-capacity compressor control valve according to claim 1, wherein a projected area of a lower face of the attractor with respect to a horizontal plane is equal to a projected area of upper faces of the magnetic body and the plunger with respect to the horizontal plane.

* * * * *